(12) United States Patent
Kapinsky et al.

(10) Patent No.: US 9,138,912 B2
(45) Date of Patent: Sep. 22, 2015

(54) POWER TOOL WITH SPROCKET COVER

(71) Applicant: Andreas Stihl AG & Co. KG, Waiblingen (DE)

(72) Inventors: Ulrich Kapinsky, Waiblingen (DE); Helmut Zimmermann, Berglen (DE); Jochen Oerding, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 329 days.

(21) Appl. No.: 13/650,149

(22) Filed: Oct. 12, 2012

(65) Prior Publication Data

US 2013/0318802 A1    Dec. 5, 2013

(30) Foreign Application Priority Data

May 31, 2012  (DE) .......................... 10 2012 010 963

(51) Int. Cl.
*B27B 17/02* (2006.01)
*B23D 57/02* (2006.01)
*B23D 59/00* (2006.01)

(52) U.S. Cl.
CPC .............. *B27B 17/02* (2013.01); *B23D 57/023* (2013.01); *B23D 59/006* (2013.01)

(58) Field of Classification Search
CPC ................... B27B 17/02–17/04; B27B 17/10; B27B 17/14; B23D 57/023; B23D 59/006
USPC ................................................. 30/381–387
See application file for complete search history.

(56) References Cited

U.S. PATENT DOCUMENTS

| 2,348,612 | A |   | 5/1944  | Deacon              |        |
|-----------|---|---|---------|---------------------|--------|
| 4,117,594 | A | * | 10/1978 | Arbuckle            | 30/381 |
| 4,129,943 | A | * | 12/1978 | Bricker             | 30/386 |
| 4,152,833 | A | * | 5/1979  | Phillips            | 30/382 |
| 4,316,327 | A | * | 2/1982  | Scott et al.        | 30/386 |
| 4,334,357 | A | * | 6/1982  | Baricevic           | 30/381 |
| 4,382,334 | A |   | 5/1983  | Reynolds            |        |
| 4,506,444 | A | * | 3/1985  | Sundstrom           | 30/384 |
| 4,530,679 | A | * | 7/1985  | Reynolds            | 30/381 |
| 4,756,221 | A |   | 7/1988  | Nitschmann et al.   |        |
| 4,785,540 | A | * | 11/1988 | Arvidsson           | 30/381 |
| 4,819,332 | A | * | 4/1989  | Sugihara et al.     | 30/383 |
| 4,819,335 | A | * | 4/1989  | Alexander           | 30/386 |
| 4,858,318 | A | * | 8/1989  | Anderson            | 30/383 |

(Continued)

FOREIGN PATENT DOCUMENTS

CN   103448100 A  * 12/2013
DE   1 933 366       2/1966

(Continued)

*Primary Examiner* — Jason Daniel Prone
(74) *Attorney, Agent, or Firm* — Gudrun E. Huckett

(57) ABSTRACT

A power tool has guide bar guiding a saw chain. A drive motor with a sprocket drives the saw chain. A sprocket compartment of the power tool housing has a peripheral wall adjacent to a roof of the saw chain and an ejection opening for cut material. The guide bar has a longitudinal center axis intersecting the saw chain in first and second deflection areas at the sprocket and the nose of the guide bar. The sprocket compartment has an exit opening where the saw chain exits. The peripheral wall of the sprocket compartment and the roof of the saw chain are disposed at a spacing relative to each other that, when the saw chain is standing still, is less than approximately 18 mm at least across 50% of a stretch from the first deflection area to the exit opening and across an entire saw chain width.

16 Claims, 4 Drawing Sheets

(56) References Cited

U.S. PATENT DOCUMENTS

| | | | | |
|---|---|---|---|---|
| 4,876,796 A | * | 10/1989 | Calkins et al. | 30/283 |
| 4,887,357 A | * | 12/1989 | Alexander | 30/383 |
| 4,945,637 A | * | 8/1990 | Anderson | 30/383 |
| 5,050,303 A | * | 9/1991 | Sinclair et al. | 30/383 |
| 5,088,197 A | * | 2/1992 | Anderson | 30/381 |
| 5,098,348 A | * | 3/1992 | O'Neel | 30/381 |
| 5,144,751 A | * | 9/1992 | Weber | 30/386 |
| 5,184,403 A | * | 2/1993 | Schliemann | 30/382 |
| 5,184,598 A | | 2/1993 | Bell | |
| 5,277,091 A | * | 1/1994 | Borgford | 30/383 |
| 5,345,686 A | * | 9/1994 | Zimmermann | 30/386 |
| 5,353,506 A | * | 10/1994 | Muller et al. | 30/386 |
| 5,522,143 A | * | 6/1996 | Schliemann et al. | 30/386 |
| 5,718,050 A | * | 2/1998 | Keller et al. | 30/383 |
| 5,896,670 A | * | 4/1999 | Gibson et al. | 30/386 |
| 5,987,786 A | * | 11/1999 | Gibson et al. | 30/387 |
| 6,112,419 A | | 9/2000 | Uhl et al. | |
| 6,186,136 B1 | | 2/2001 | Osborne | |
| 6,237,228 B1 | * | 5/2001 | Moody | 30/381 |
| 6,435,070 B1 | | 8/2002 | Weber | |
| 6,877,233 B1 | * | 4/2005 | Franke | 30/386 |
| 8,256,335 B1 | | 9/2012 | Canon | |
| 8,353,110 B2 | * | 1/2013 | Galster | 30/381 |
| 8,869,787 B2 | * | 10/2014 | Tholking et al. | 30/382 |
| 2001/0042311 A1 | | 11/2001 | Kondo et al. | |
| 2003/0029045 A1 | * | 2/2003 | Mang | 30/384 |
| 2003/0088987 A1 | * | 5/2003 | Jong | 30/381 |
| 2006/0016081 A1 | * | 1/2006 | Keeton et al. | 30/386 |
| 2006/0107804 A1 | * | 5/2006 | Annala | 30/381 |
| 2007/0089303 A1 | * | 4/2007 | Graves | 30/384 |
| 2008/0034597 A1 | | 2/2008 | Pfleiderer et al. | |
| 2009/0077815 A1 | | 3/2009 | Wolf et al. | |
| 2010/0088905 A1 | * | 4/2010 | Pellenc | 30/386 |
| 2011/0308096 A1 | * | 12/2011 | Yu et al. | 30/386 |
| 2012/0066917 A1 | * | 3/2012 | Okouchi | 30/386 |
| 2014/0290074 A1 | * | 10/2014 | Takayanagi et al. | 30/382 |
| 2014/0345149 A1 | * | 11/2014 | Etou et al. | 30/383 |

FOREIGN PATENT DOCUMENTS

| | | |
|---|---|---|
| DE | 20 2011 051 060 U1 | 11/2011 |
| DE | 102012010963 A1 * | 12/2013 |
| EP | 0 337 753 A2 | 10/1989 |
| EP | 0 474 446 A2 | 3/1992 |
| EP | 2669035 A1 * | 12/2013 |
| WO | 20081008900 A2 | 1/2008 |

* cited by examiner

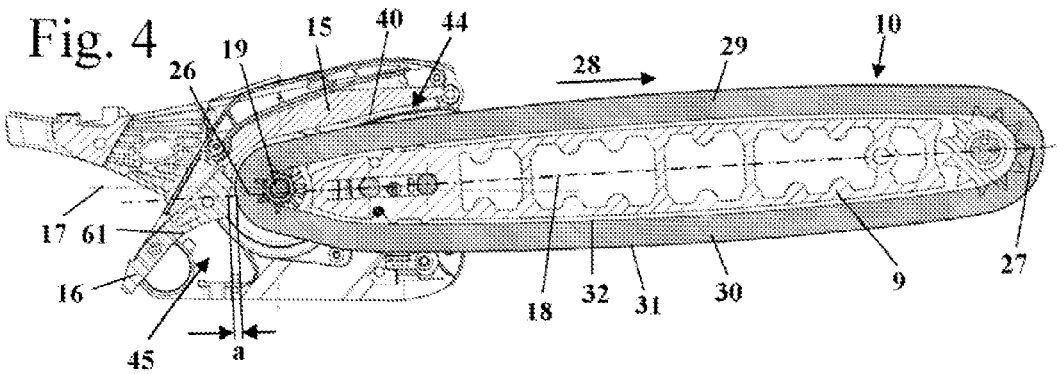
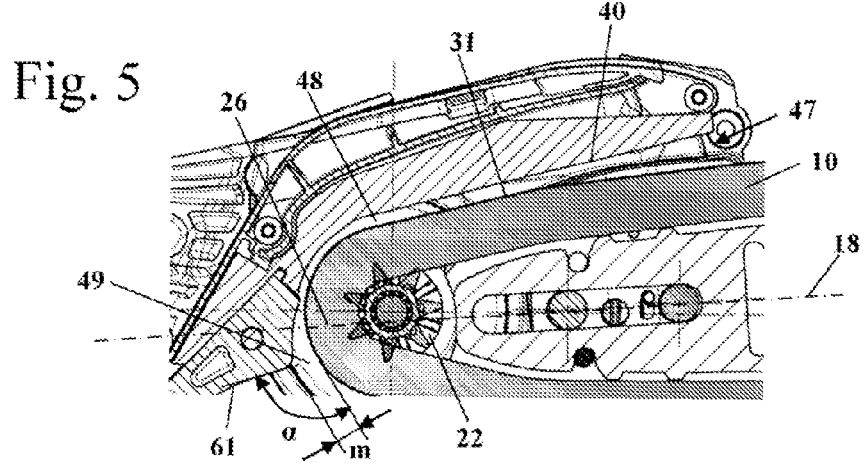
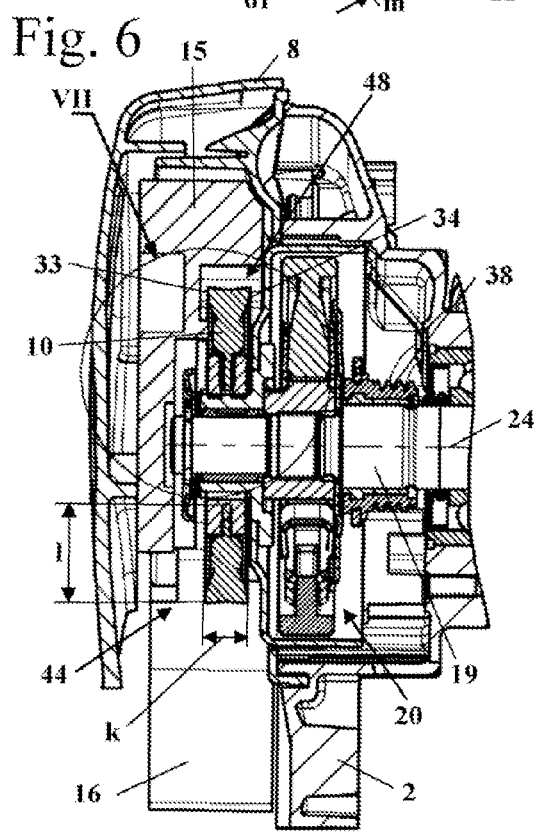
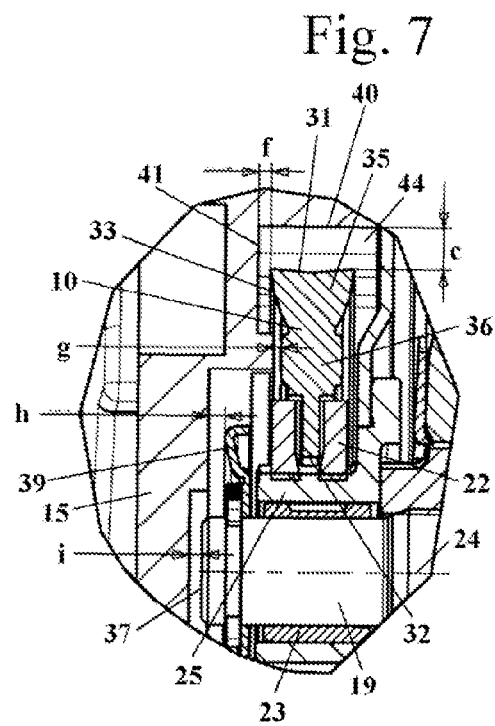

POWER TOOL WITH SPROCKET COVER

BACKGROUND OF THE INVENTION

The invention relates to a power tool with a sprocket cover. The power tool comprises a housing to which a guide bar is attached. The power tool comprises a drive motor that serves for driving a saw chain that is guided about the guide bar in a running direction. The saw chain has at least one cutting tooth that defines a roof of the saw chain. The drive motor drives the saw chain by means of a sprocket that is arranged in a sprocket compartment wherein the sprocket compartment is covered by a sprocket cover and has a peripheral wall that forms a boundary of the sprocket compartment adjacent to the roof of the saw chain. The sprocket compartment has an ejection opening for cut material that opens at the roof of the saw chain. The guide bar has a longitudinal center axis that intersects the saw chain in a first deflection area at the sprocket and in a second deflection area at the nose of the guide bar, wherein the saw chain is driven in a first section of the saw chain in a running direction from the first deflection area to the second deflection area and in a second section of the saw chain from the second deflection area to the first deflection area. The saw chain exits the sprocket compartment at an exit opening that is arranged at the first section.

DE 1 933 366 discloses a power tool, i.e., a motor chain saw with a guide bar and a sprocket cover. In order to achieve excellent discharge of the cuttings, DE 1 933 366 provides cutouts at the periphery of the drive wheel. In the area in which no cutouts are provided, a great spacing between the peripheral wall of the sprocket compartment and the roof of the saw chain is formed.

It has been found that, in particular when cutting long-fiber material or when performing longitudinal cuts, the space that is provided between the saw chain and the sprocket cover may become clogged and filled up with cuttings. This area must be permanently cleared by the saw chain so that the cutting performance is decreased. When the area is completely clogged, the operator must clean the sprocket compartment.

In connection with a pole pruner, U.S. Pat. No. 6,112,419 discloses to arrange the ejection opening laterally relative to the saw chain. In order to eject the cut material or cuttings laterally, a peripheral wall that is slanted relative to the drive axis is positioned adjacent to the ejection opening. In advancing direction and in trailing direction relative to the ejection opening, a great spacing between the saw chain and the peripheral wall of the sprocket is formed.

SUMMARY OF THE INVENTION

It is an object of the present invention to provide a power tool of the aforementioned kind that exhibits an improved cutting performance.

In accordance with the present invention, this is achieved in that the spacing between the peripheral wall of the sprocket compartment and the roof of the saw chain, when the saw chain is standing still, is less than approximately 18 mm across at least 50% of the stretch extending from the first deflection area to the exit opening and across the entire width of the saw chain.

Surprisingly, it has been found that clogging of the area between the sprocket cover and the saw chain can be effectively prevented in that the free space between the sprocket cover and the saw chain is designed to be as small as possible. It has been surprisingly found that by a minimal spacing between saw chain and peripheral wall the cutting performance is very significantly improved. Experiments have proven an increase of the cutting performance by 50% for longitudinal cuts. It has also been found that a cutting that is pulled into the channel causes additional cuttings to deposit very quickly and a complete clogging of the channel occurs quickly. In contrast to the prior art solutions, the present invention therefore does not provide a sufficient space for cuttings so that the saw chain will come into contact with cuttings or cut material when already a lot of cuttings or cut material has been deposited, but the invention provides that deposition of a first cutting is prevented from the start. Even in case of longitudinal cuts or when cutting long-fiber material, clogging of the sprocket compartment with cuttings can be prevented in this way.

The minimal spacing must not be mandatorily provided across the entire stretch. Greater spacings in individual sections between the first deflection area and the exit opening may be acceptable. Clogging of the sprocket compartment with cuttings can be prevented effectively when the spacing between the peripheral wall of the sprocket compartment and the roof of the saw chain, when the saw chain is standing still, is less than approximately 18 across at least 50% of the stretch extending from the first deflection area to the exit, opening and across the entire width of the saw chain. At a spacing of less than approximately 18 mm, pulling in of a cutting that causes deposition of further cuttings and thus clogging of the sprocket compartment can be prevented to a satisfactory degree for cuttings of usual size. A cutting that is pulled into the channel between saw chain and sprocket cover, despite of the inventively provided spacing, is entrained as a result of the minimal spacing by the saw chain, or comminuted, and is conveyed out of the sprocket compartment.

In the context of the invention, the roof of the saw chain is to be understood as a connection, extending in the running direction of the saw chain, of the top edges of all cutting teeth facing away from the guide bar, i.e., an envelope of the top edges of all cutting teeth in the longitudinal direction of the saw chain. In this context, the fact that in the area between the cutting teeth the saw chain has a reduced height in comparison to the area of the cutting teeth is of no consequence for determining the aforementioned spacing. The spacing is measured as the saw chain is standing still, i.e., when the saw chain is not driven. As soon as the saw chain moves, centrifugal forces cause the saw chain to lift off the guide bar in outward direction so that the spacing between the roof of the saw chain and the peripheral wall is reduced. Advantageously, the spacing at the first deflection area is less than approximately 18 mm.

Advantageously, the spacing is less than approximately 18 mm across at least 75% of the stretch, in particular across the entire stretch, from the first deflection area to the exit opening. Expediently, the spacing is less than approximately 15 mm across more than 50% of the entire stretch, in particular across more than 75% of the entire stretch, preferably across the entire stretch. A spacing of up to approximately 10 mm is considered to be particularly advantageous. It has been found that the saw chain in the area of the exit opening is moved outwardly in operation by approximately 5 mm. A spacing of approximately 10 mm when the saw chain is at rest leads therefore to a spacing of approximately 5 mm in operation. A spacing of approximately 5 mm prevents that a cutting is pulled into the area between the roof of the saw chain and the peripheral wall. In this way, the deposition of cuttings is prevented and it is at the same time ensured that the saw chain does not contact the peripheral wall. In this way, a very high cutting performance is achieved.

In the running direction, the ejection opening of the sprocket compartment is positioned advantageously upstream of the first deflection area. At the first deflection area the spacing between saw chain and peripheral wall is advantageously less than approximately 10 mm, in particular less than approximately 5 mm. A spacing of approximately 2 mm to 3 mm has been found to be particularly advantageous. By selecting the spacing in the first deflection area to be so small, it can be largely prevented that cuttings can be pulled into the channel formed between the saw chain and the peripheral wall.

Advantageously, between saw chain and peripheral wall a channel is formed wherein at the inlet opening into the channel a guide part is arranged that guides cut material to the ejection opening. The guide part serves as a deflector and prevents that cut material or cuttings can enter the channel. The inlet opening into the channel is advantageously arranged, viewed in the running direction of the saw chain, upstream of the first deflection area. In order to prevent that cut material or cuttings are guided by the guide part in the direction toward the channel, it is provided that the angle that is defined by the guide surface of the guide part at the inlet opening relative to the roof of the saw chain is more than 90 degrees. The angle is in particular more than 110 degrees. With the aforementioned orientation of the guide surface a funnel effect at the guide part in the direction toward the channel is prevented. Advantageously, the spacing between the roof of the saw chain and the peripheral wall at the inlet opening is selected to be relatively small. The spacing, when the saw chain is standing still, is advantageously less than approximately 20 mm, in particular less than approximately 15 mm. It is particularly advantageous when the spacing is approximately 10 mm. In this way, cuttings are prevented from being pulled into the channel.

The side of the sprocket compartment that is facing away from the housing is advantageously bounded by a sidewall. The spacing between the saw chain and the sidewall is less than approximately 5 mm across at least 50% of the stretch, extending from the first defection area to the exit opening, when the saw chain is standing still, and this spacing is maintained advantageously across the entire height of the saw chain. In this context, the spacing is measured perpendicular to the plane of the guide bar. Advantageously, the aforementioned spacing exists across at least 76% of the stretch, extending from the first deflection area to the exit opening, in particular across the entire stretch. Also, the lateral free space between saw chain and sprocket cover is selected to be as small as possible in order to prevent effectively also a deposition of cuttings laterally of the saw chain. The minimal lateral spacing has at the same time the result that the sprocket cover can be designed to be smaller so that the total width of the power tool is reduced. In this way, handling of the power tool is significantly facilitated. For the lateral spacings, also the widest area of the saw chain is taken into consideration. Different widths in different areas are not taken into account. For determining the spacings, the saw chain is considered as a solid body whose cross-sectional shape corresponds to the side view of the saw chain in the running direction, i.e. in the longitudinal direction of the saw chain.

The saw chain has a head area and the spacing between the head area and the sidewall is advantageously less than approximately 5 mm across at least 50% of the stretch, in particular across the entire stretch, extending from the first deflection area to the inlet into the guide bar. The head area is the area of the saw chain that is formed by the at least one cutting tooth. In particular, the spacing in the head area is less than approximately 3 mm. In this way, deposition of cuttings in the head area of the saw chain is largely prevented. The saw chain has advantageously a connecting area. The connecting area of the saw chain is the area in which the individual members of the saw chain are connected to each other in an articulated fashion, for example, by a connecting bolt. The spacing of the connecting area to the sidewall along the stretch extending from the first deflection area to the inlet into the guide bar is advantageously less than approximately 6 mm. At the inlet into the guide bar the connecting area of the saw chain is usually already guided laterally in order to ensure a low-friction entry into the guide bar. It is now proposed to provide additionally a very small lateral spacing between saw chain and sprocket cover in that area adjacent to the sprocket from the first deflection area to the inlet into the guide bar. In this way, deposition of cuttings in this area can be effectively prevented also in the lateral direction. The spacing of the connecting area to the sidewall along the stretch extending from the first deflection area to the inlet into the guide bar is advantageously less than approximately 4 mm.

It is proposed that also at the end face of the drive shaft only a minimal lateral spacing to the sidewall of the sprocket compartment is to be provided. Advantageously, the spacing at the end face of the drive shaft of the drive motor is less than approximately 5 mm, in particular less than approximately 2 mm. In this way, also in this area the deposition of cut material is effectively prevented.

A simple configuration is achieved when the sprocket compartment is provided with a fill member that at least partially delimits the sprocket compartment. In this way, already existing power tools can be retrofitted in accordance with the invention by inserting a fill member into an existing sprocket cover. However, it can also be provided that the sprocket cover is designed to be appropriately narrow in order to achieve the aforementioned minimal spacings. It this way, the total width of the power tool can be significantly reduced also. Advantageously, on the sprocket cover a glide bar is provided that laterally guides the saw chain at the inlet into the guide bar. In this way, the sprocket compartment is advantageously bounded or delimited at least partially by the glide bar. Advantageously, the glide bar extends into the area of the sprocket so that the lateral boundary of the sprocket compartment is at least partially, in particular largely, formed by the glide bar itself. In this way, by providing a differently shaped greater glide bar, the volume of the sprocket compartment can be reduced significantly and deposition of cuttings can be prevented in this way.

Embodiments of the invention will be explained in the following with the aid of the drawings.

BRIEF DESCRIPTION OF THE DRAWING

FIG. 4 shows a section view along the section line IV-IV of FIG. 3.

FIG. 5 shows a detail of the area of the sprocket of FIG. 4.

FIG. 6 shows a section view along the section line VI-VI of FIG. 2.

FIG. 7 shows the detail VII of FIG. 6 in an enlarged view.

DESCRIPTION OF THE PREFERRED EMBODIMENTS

Figure 1:
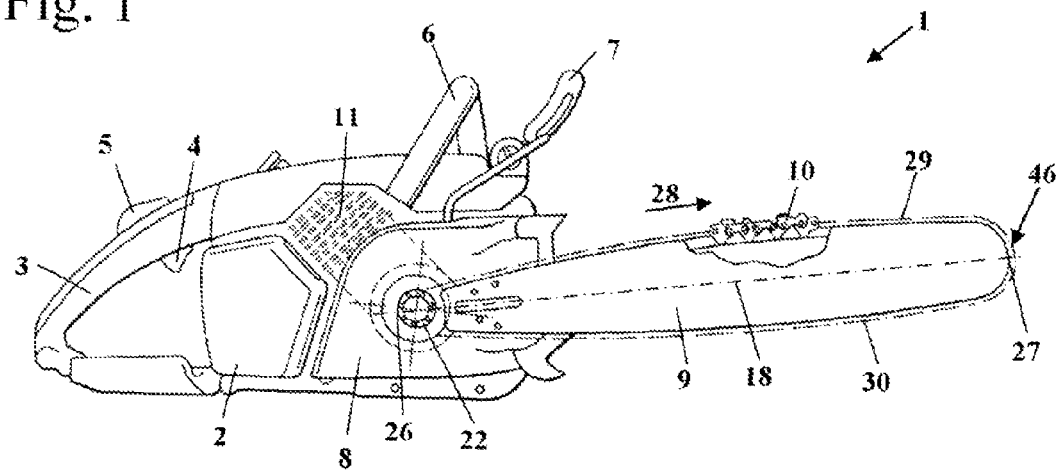
FIG. 1 is a schematic side view of a motor chainsaw.

FIG. 1 shows a motor chain saw 1 as an embodiment of a power tool. The present invention however can also be used in connection with other power tools, for example, pole pruners, tree harvesting machines or the like.

The motor chain saw 1 has a housing 2 on which a rear grip 3 and a front handle 6 are secured. In the housing 2 a drive motor 11 is arranged. Housing 2 encompasses all housing parts of the motor chainsaw 1 that define the outer contour. Advantageously, the part of the housing 2 where the drive motor 11 is secured is vibration-decoupled from the part where the rear handle 3 and the front handle 6 are secured. On the rear handle 3 a trigger 4 as well as a trigger lock 5 are supported so as to be pivotable. On the housing 2 a guide bar 9 is secured and a saw chain 10 is disposed thereon so as to circulate about the guide bar 9. The saw chain 10 is driven by drive motor 11 in the running direction 28. The guide bar 9 has longitudinal center axis 18 that intersects the saw chain 10 next to the sprocket 22 in a first deflection area 26 and next to the nose 46 of the guide bar 9 that is facing away from the housing 2 at a second deflection area 27. The deflection areas 26, 27 are sections through the saw chain 10 in a section plane that contains the longitudinal center axis 18 and that is perpendicular to the plane of the guide bar 9. Within a first section 29, the saw chain 10 moves in operation from the first deflection area 26 to the second deflection area 27. But doing so, the saw chain 10 moves away from the housing 2. Within a second section 30, the saw chain 10 moves from the second deflection area 27 to the first deflection area 26. In this area, the saw chain 10 moves toward the housing 2 and the rear grip 3 of the motor chain saw 1. On the housing 2 of the motor chain saw 1, a sprocket cover 8 is arranged that covers the area of the sprocket 22. On the side of the front handle 6 that is facing the guide bar 9, a hand guard 7 is arranged that serves advantageously as a trigger for a chain brake.

Figure 2:
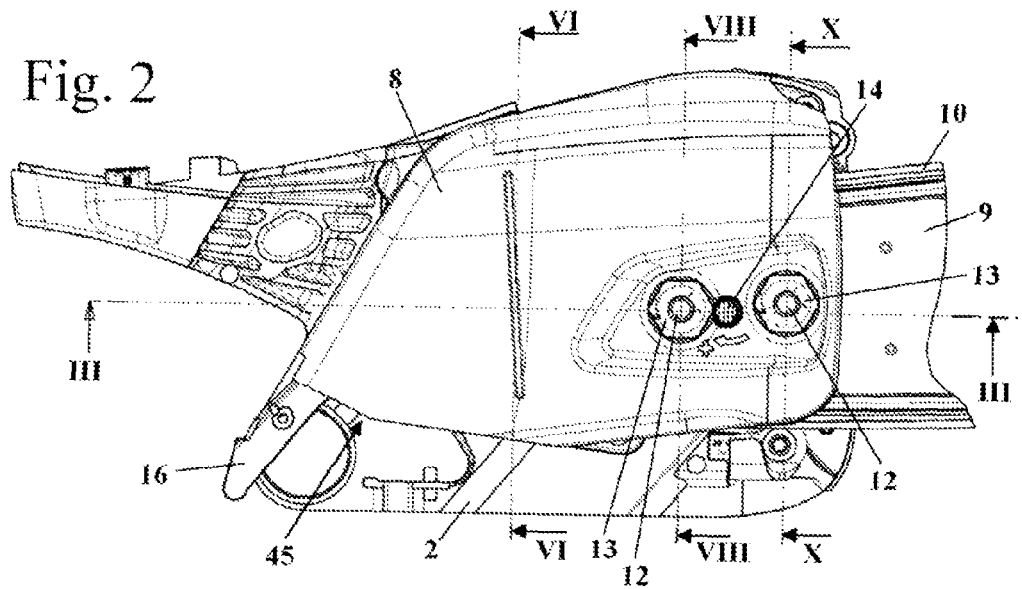
FIG. 2 is a side view of the motor chainsaw in the area of the sprocket cover with partially removed housing parts.

FIG. 2 shows the area of the sprocket cover 8 in detail. The sprocket cover 8 is secured with two fastening nuts 13 on the housing 2. The fastening nuts 13 are screwed onto fastening bolts 12 that are secured in the housing 2 and that penetrate the guide bar 9. The guide bar 9 is clamped between the housing 2 and the sprocket cover 8. In the area between the fastening bolts 12, an adjusting screw 14 penetrates through the sprocket cover 8; this screw 14 serves for adjusting the quantity of oil supplied to the saw chain 10. The side of the sprocket cover 8 that is facing away from the guide bar 9 and that is facing downwardly in the usual rest position of the motor chainsaw is provided with an ejection opening 45 for the cut material. On the side of the ejection opening 45 that is facing the rear grip 3, a guide part 16 is arranged that guides cut material such as cuttings or the like to the rear and downward in the direction toward the ground. The guide part 16 can be comprised of elastic material such as rubber.

In FIGS. 2 through 12, the saw chain 10 is illustrated as a solid component with a constant cross-section across the entire length of the saw chain 10. The schematically illustrated solid component characterizes the space that the saw chain 10 will occupy upon movement in the running direction 28. Centrifugal forces that act on the saw chain 10 and that move the saw chain outwardly are not taken into consideration. The schematic illustration of the saw chain 10 characterizes the maximum extension of the saw chain 10 in the respective area upon circulation about the guide bar 9. The space that is occupied by the saw chain 10 upon slowly circulating about the guide bar 9 is decisive for determining all spacings of the saw chain 10 relative to neighboring components and wails.

Figure 3:
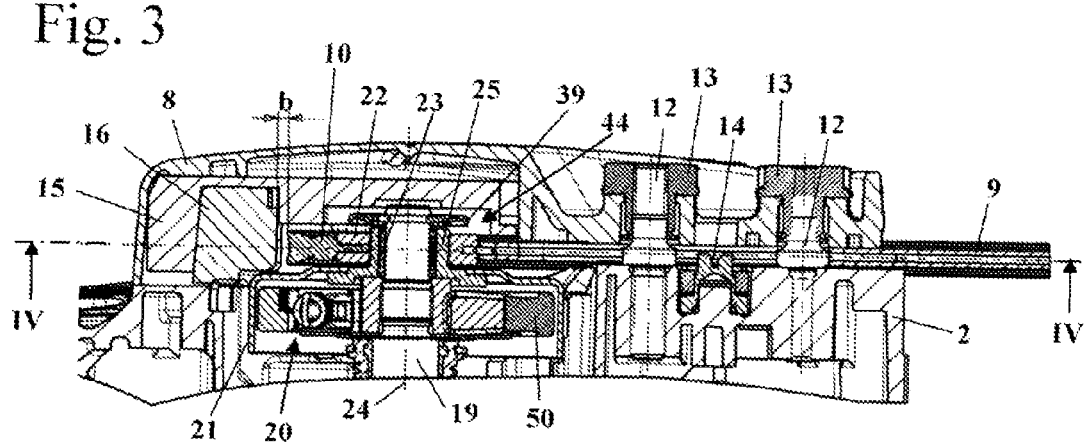
FIG. 3 shows a section view along the section line III-III of FIG. 2.

FIG. 3 shows a section through the housing 2 and the sprocket cover 8 in a section plane 17 (FIG. 4) that is slanted slightly relative to the longitudinal center axis 18 of the guide bar 9. As shown in FIG. 3, in the sprocket cover 8 a fill member 15 is arranged that greatly reduces the free (unoccupied) volume of the sprocket cover 8. The saw chain 10 is arranged in a sprocket compartment 44 that is bounded by the sprocket cover 8, the fill member 15, and the guide part 16. The sprocket compartment 44 is designed to be as small as possible so that between the saw chain 10 and the fill member 15 or the guide part 16 there is only minimal space. In this way, it is prevented that cuttings deposit between the saw chain 10 and the sprocket cover 8 and lower the cutting performance of the motor chainsaw 1.

As shown in FIG. 3, there is a spacing b between the saw chain 10 and the guide bar 16 in the illustrated section plane. The spacing b is significantly smaller than approximately 10 mm. The spacing b is advantageously smaller than 5 mm. In the illustrated embodiment, the spacing b is approximately 2 mm up to approximately 3 mm.

FIG. 3 shows also the drive action of the saw chain 10. The drive motor 11 which is embodied in the illustrated embodiment as an internal combustion engine, in particular a single cylinder two-stroke engine, has a drive shaft 19, i.e., a crankshaft. The drive shaft 19 is supported so as to rotate about axis of rotation 24. A centrifugal clutch 20 is fixedly connected to the drive shaft 19. The centrifugal clutch 20 has centrifugal weights 50 that, upon reaching a constructively predetermined speed (revolution per minute) will be radially deflected in outward direction and, in their outwardly deflected position, will engage frictionally a clutch drum 21. The clutch drum 21 is provided with a pinion 25 on its side that is facing away from the drive motor 11. In the area of the pinion 25 the clutch drum 21 is rotatably supported by a bearing 23 on the drive shaft 19. On the pinion 25 the sprocket 22 is fixedly secured. It can also be provided that a sprocket 22 that is configured as a pinion is connected immediately fixedly with the clutch drum 21. The saw chain 10 is guided on the sprocket 22. As also shown in FIG. 3, the pinion 25 and the sprocket 22 are covered at their end faces by a cover disk 39 that secures the sprocket 22 and the pinion 25 in axial direction on the drive shaft 19.

In FIG. 4, the sprocket compartment 44 is illustrated in longitudinal section. In FIG. 4, the saw chain 10 is also illustrated as a solid body that encloses the area through which the saw chain 10 is moving. The first section 29 corresponds to the top strand of the saw chain 10 and the second section 30 to the bottom strand. The saw chain 10 has a roof 31 that characterizes the side that is facing outwardly away from the guide bar 9. On the opposite side that is facing the guide bar 9 and that engages the guide bar 9, the saw chain 10 has a base 32.

The sprocket compartment 44 is bounded by a peripheral wall 40. This wall 40 is positioned opposite the roof 31 of the saw chain 10. The peripheral wall 40 is formed in the illustrated embodiment by fill member 15 and, adjacent to the first deflection area 26, by the guide part 16. The peripheral wall 40 has relative to the roof 31 of the saw chain 10 at the first deflection area 26 a spacing a that is less than approximately 18 mm. The spacing a is advantageously less than approximately 15 mm, in particular less than approximately 10 mm, in the illustrated rest position of the saw chain 10. In the embodiment, the spacing a is less than approximately 5 mm. As shown in FIG. 4, the spacing between saw chain 10 and peripheral wall 40 is smallest in the area of the section plane 17. The section plane 17 corresponds to the section plane of FIG. 3. In the section plane 17 the spacing b exists between peripheral wall 40 and saw chain 10. In the running direction 28, the spacing increases up to the exit opening 47 illustrated in FIG. 5 where the saw chain 10 exits from the sprocket compartment 44. The spacing between saw chain 10 and peripheral wall 40 is smaller than approximately 18 mm across at least 50% of the stretch, extending from the first deflection area 26 to the exit opening 47. In the embodiment, the spacing is smaller than 10 mm across the entire stretch extending from the first deflection area 26 to the exit opening 47. Advantageously, the spacing is smaller than approximately 18 mm, in particular smaller than approximately 15 mm, across at least 75% of the stretch, in particular across the entire stretch. In operation, the saw chain 10, as a result of centrifugal forces, will move away from the guide bar 9 outwardly wherein the movement in outward direction is greater the farther the saw chain 10 is removed from the deflection area 26 and 27. The peripheral wall 40 follows approximately the course of the saw chain 10 in operation. In operation, the spacing between the saw chain 10 and the peripheral wall 40 in the area of the exit opening 47 is approximately 5 mm smaller than in the state of rest of the saw chain 10. Advantageously, in operation the spacing between the roof 31 of the saw chain 10 and the peripheral wall 40 is approximately 5 mm along the stretch from the first deflection area 26 to the exit opening 47.

As shown in FIG. 5, between the saw chain 10 and the peripheral wall 40 a channel 48 is formed that is advantageously embodied to be as small as possible so that only a small spacing between the saw chain 10 and the peripheral wall 40 remains. At the second section 30, i.e., in the running direction 28 in front of the first deflection area 26, there is an inlet opening 49 into the channel 48. At the inlet opening 49 there is a spacing m between the saw chain 10 and the peripheral wall 40 that is advantageously also smaller than 20 mm, in particular smaller than approximately 15 mm. In the illustrated embodiment, the spacing m is approximately 10 mm. Advantageously, the spacing between the roof 31 of the saw chain 10 and the peripheral wall 40, along the stretch from the inlet opening 49 to the exit opening 47, is less than approximately 18 mm, in particular less than approximately 15 mm, preferably approximately 10 mm or less.

As shown in FIG. 4, the guide part 16 has a guide surface 61 that delimits an ejection opening 45. The guide surface 61, in relation to the rest position of the motor chainsaw 1 illustrated in FIG. 1, is oriented to the rear and downward and deflects the cuttings in the direction to the ground. As shown in FIG. 5, adjacent to the inlet opening 49, the guide surface 61 is positioned relative to the roof 31 of the saw chain 10, i.e., relative to a straight line that extends tangentially to the roof 31 of the saw chain 10 in the area of the inlet opening 49, at an angle $\alpha$ that is greater than 90 degrees. Advantageously, the angle $\alpha$ is greater than 110 degrees. In this way, the guide surface 61 does not form together with the roof 31 of the saw chain 10 a funnel that passes cuttings into the channel 48 but instead the guide surface 61 adjacent to the inlet opening 49 acts as a deflector that deflects the cuttings in the direction toward the ejection opening 45.

FIG. 6 shows a section view of the drive shaft 19 and the sprocket cover 8 perpendicularly to the section plane 17 indicated in FIG. 4. As shown in FIG. 6, adjacent to the centrifugal clutch 20 on the side of the centrifugal clutch 20 that is facing away from the saw chain 10 a worm gear 38 is fixedly arranged on the drive shaft 19. The worm gear 38 serves for driving a lubricant oil pump that conveys lubricant oil for the saw chain. As shown in FIG. 6, the saw chain 10 has a width k that is measured parallel to the axis of rotation 24 and a height l perpendicular to the axis of rotation 24 and measured in the plane of the guide bar 9 (FIG. 1). The spacings between the saw chain 10 and the peripheral wall 40 indicated in the FIGS. 3 to 5 exist advantageously at least across the entire width k of the saw chain 10. As illustrated in FIG. 6, the peripheral wall 40 is planar and projects laterally slightly past the saw chain 10. The peripheral wall 40 extends parallel to the axis of rotation 24. As also shown in FIG. 6, the saw chain 10 has an inner side 34 that is facing the housing 2 as well as an exterior side 33 that is facing away from the housing 2 and is facing the sprocket cover 8.

As shown in FIG. 7, the exterior side 33 of the saw chain 10 also has only a small lateral spacing relative to the fill member 15. As shown in FIG. 7, the sprocket compartment 44 is bounded or delimited by a sidewall 41 on the side that is facing away from the housing 2. The saw chain 10 has a head area 35 and a connecting area 36. The roof 31 is formed at the head area 35. The head area 35 is formed by the cutting teeth of the saw chain 10; this will be described in the following in more detail. In the head area 35 the exterior side 33 of the saw chain 10 has a spacing f relative to the sidewall 41 that is advantageously less than 5 mm. In particular, this spacing f is less than 3 mm. In the illustrated embodiment, the spacing f is approximately 1 mm to 1.5 mm. As also shown in FIG. 7, the connecting area 36 has relative to the sidewall 41 a spacing g that is less than 6 mm. In particular, the spacing g is less than 4 mm. In the illustrated embodiment, the spacing g is between 0.5 mm and 2 mm. The distance between the saw chain 10 and the sidewall 41 is advantageously less than approximately 6 mm, in particular less than approximately 3 mm, across the entire height l of the saw chain 10. In this way, the deposition of cuttings on the exterior side 33 of the saw chain 10 is prevented.

As also shown in FIG. 7, in the area of the sprocket 22 and the drive shaft 19 there is only a minimal intermediate space between the drive unit and the fill member 15. The cover disk 39 has relative to the sidewall 41 a spacing h that is measured parallel to the axis of rotation 24 and that is advantageously also less than 5 mm. In the illustrated embodiment, the spacing h is between approximately 1 mm and approximately 2 mm. The drive shaft 19 has an end face 37 that is facing the sidewall 41 and that has a spacing i relative to the sidewall 41. The spacing i is also less than 5 mm. In the embodiment, the spacing i is approximately 1 mm to approximately 1.5 mm. All spacings f, g, h, i are measured parallel to the axis of rotation 24 and perpendicular to the plane of the guide bar 9. FIG. 7 shows that the sidewall 41 is of a stepped configuration and that it follows the course of the drive shaft 19, the sprocket 22, and the saw chain 10. In this way, a very small free (unoccupied) volume between the drive unit of the saw chain 10, the saw chain 10 itself, and the sprocket cover 8 can be realized.

FIG. 7 shows also the bearing 23 and the pinion 25 in detail. FIG. 7 also shows that the base 32 of the saw chain 10 projects into the sprocket 22. The roof 31 of the saw chain 10 has relative to the peripheral wall 40, in the section plane illustrated in FIG. 7, a spacing c that is significantly smaller than approximately 20 mm. In the embodiment, the spacing c is smaller than approximately 5 mm and is advantageously approximately 3 mm to 4 mm. The spacings f and g illustrated in FIG. 7 relative to the sidewall 41 are advantageously existing at least across the stretch from the first deflection area 26 to the inlet for the saw chain 10 into the guide bar 9.

Figure 8:
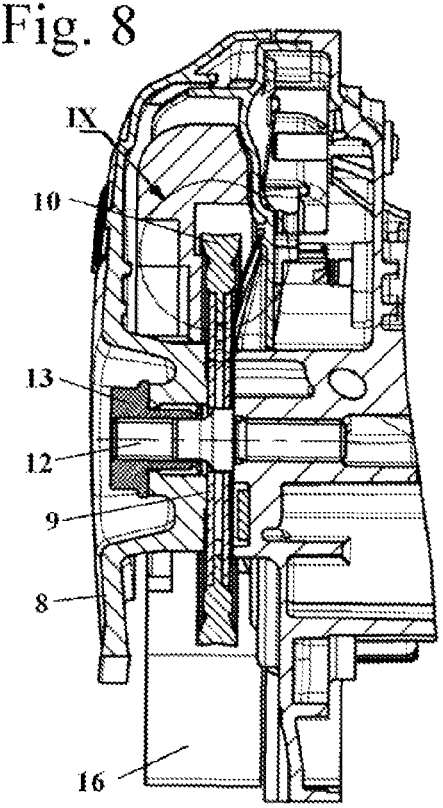
FIG. 8 shows a section view along the section line VIII-VIII of FIG. 2.
Figure 9:
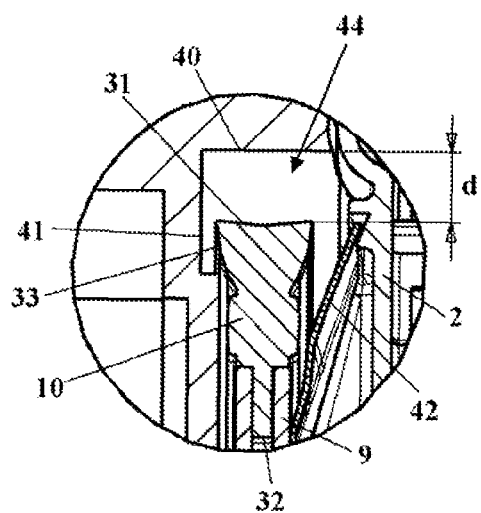
FIG. 9 shows the detail IX of FIG. 8 in an enlarged view.

FIG. 8 shows the saw chain 10 in the area of the inlet into the guide bar 9. FIG. 9 shows that the roof 31 has a spacing d relative to the peripheral wall 40 that significantly smaller than 18 mm. In the embodiment, the spacing d is approximately 5 mm to approximately 6 mm. The spacings between the exterior side 33 of the saw chain 10 and the sidewall 41 correspond to the spacings illustrated in FIG. 7. As also shown in FIG. 9, adjacent to the inlet for the saw chain 10 into the guide bar 9, a lateral plate 42 is arranged at the housing 2 for guiding the saw chain 10.

Figure 10:
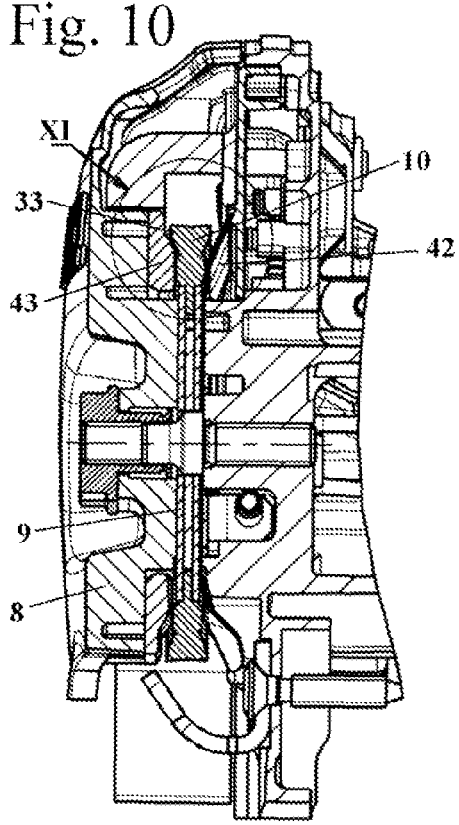
FIG. 10 shows a section along the section line X-X of FIG. 2.
Figure 11:
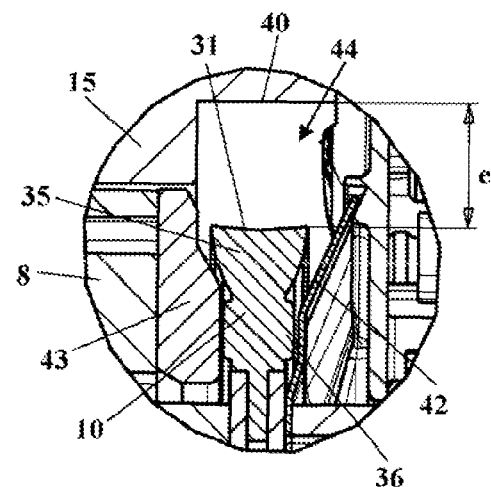
FIG. 11 shows the detail XI of FIG. 10 in an enlarged view.

FIG. 10 also shows that on the sprocket cover 8 a glide bar 43 is arranged that guides the saw chain 10 on its exterior side 33. The glide bar 43 extends in the area of the fastening bolt 12 that is facing the nose 46 of the guide bar 9 (FIG. 1). As shown in FIG. 11, the connecting area 36 of the saw chain 10 is resting against the glide bar 43. In the head area 35, the glide bar 43, like the lateral plate 42, has a minimal lateral spacing relative to the saw chain 10. Relative to the peripheral wall 40, the roof 31 of the saw chain 10 has a spacing e that is also significantly smaller than 18 mm. The spacing e is advantageously less than approximately 15 mm, in particular approximately 10 mm.

Figure 12:
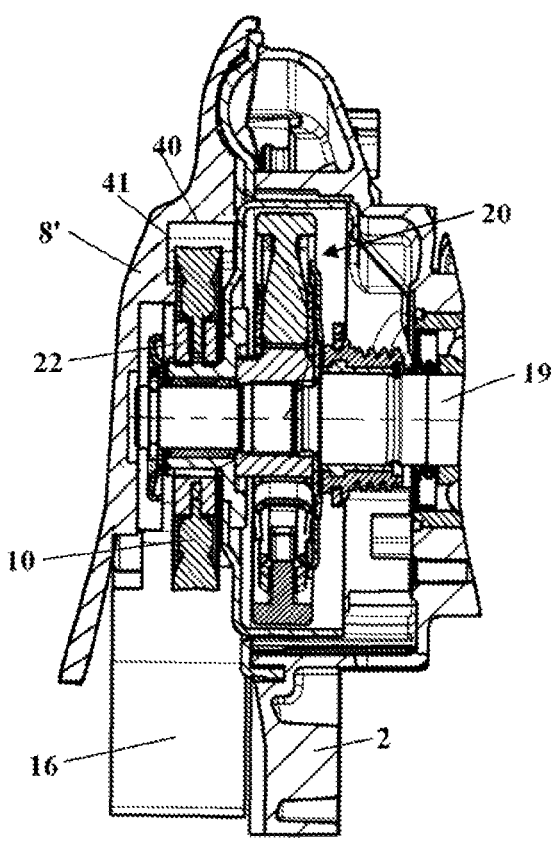
FIG. 12 shows a section of an embodiment of the power tool along the section line VI-VI in FIG. 2.

FIG. 12 shows an embodiment of a sprocket cover 8. Same reference numerals as in the preceding Figures indicate components that correspond with each other. The configurations of the drive, the sprocket 22 and the saw chain 10 are identical to that of the preceding Figures. Also the spacings relative to the peripheral wall 40 and the sidewall 41 of the sprocket cover 8 are identical. In the embodiment according to FIG. 12, the sprocket cover 8' has no fill member 15 but the sprocket cover 8 is of a narrow configuration and forms the peripheral wall 40 and the side (end) wall 41. In this way, the entire constructive width of the motor chainsaw 1 can be significantly reduced. Alternatively, the reduced inner space of the sprocket cover 8 can also be realized by a foam fill of the sprocket cover 8, by arranging a partition therein, or by enlarging glide bar 43 in such a way that the glide bar 43 partially fills the volume underneath the sprocket cover 8.

Figure 13:
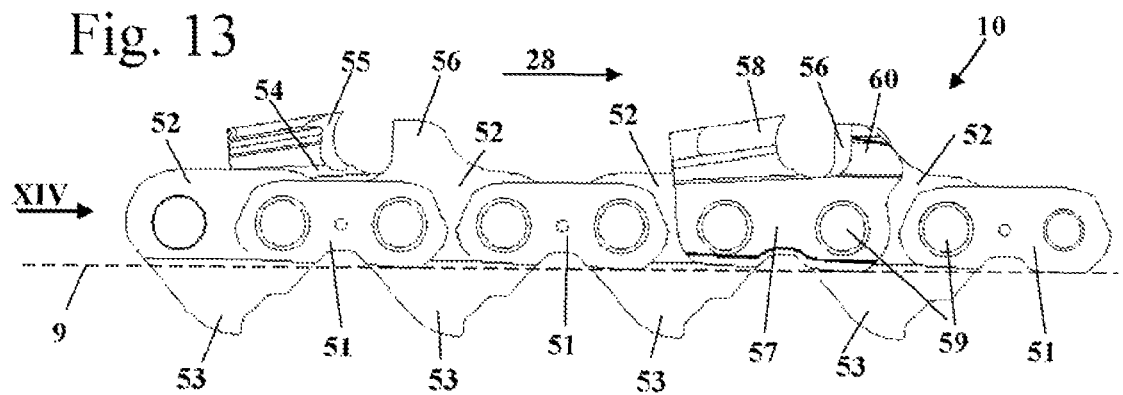
FIG. 13 shows a side view of a saw chain.
Figure 14:
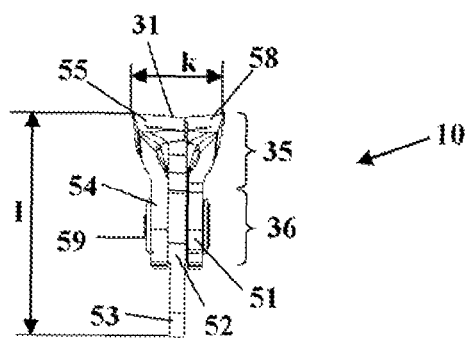
FIG. 14 shows a detail of the saw chain of FIG. 13 in the direction of arrow XIV of FIG. 13.

The FIGS. 13 and 14 show an embodiment of a saw chain 10. The saw chain 20 has connecting members 51 that are connected in articulated fashion with drive members 52 by means of connecting bolts 51. The drive members 52 have drive projections 53 which project into the guide bar 9 and are driven by the sprocket 22. The connecting members 51 are partially embodied as cutting members. In FIG. 13, a left cutting member 54 is illustrated that has a left cutting tooth 55. Leading the cutting tooth 55, a depth limiter 56 is arranged on the drive member 52 that is in leading position. The cutting member 54 also has a depth limiter that is covered in FIG. 13 by the depth limiter 56. The saw chain 10 has also right cutting members 57 with a right cutting tooth 58. In front of the cutting tooth 58 a depth limiter 60 is formed at the cutting member 57. Adjacent to the depth limiter 60, there is a depth limiter 56 of the drive member 52. A different configuration of the saw chain 10 may also be provided.

As shown in FIG. 14, the top sides of the cutting teeth 55 and 58 that are facing away from the base 52 form the roof 31 of the saw chain 10. The head area 35 is formed by the cutting teeth 55 and 58. The connecting area 36 is the area in which the connecting members 51 are connected with the drive members 52 by the connecting bolts 59. The solid body which is illustrated in the FIGS. 3 to 12 that represents the saw chain 10 schematically results from the peripheral line of the saw chain 10 in the view in the running direction 28, as shown in FIG. 14.

The specification incorporates by reference the entire disclosure of German priority document 10 2012 010 963.6 having a filing date of May 31, 2012.

While specific embodiments of the invention have been shown and described in detail to illustrate the inventive principles, it will be understood that the invention may be embodied otherwise without departing from such principles.

What is claimed is:

1. A power tool comprising:
   a housing;
   a sprocket cover connected to the housing, wherein a sprocket compartment is disposed between the sprocket cover and the housing and wherein the sprocket compartment is delimited by boundary walls;
   a guide bar having a first end and a second end, the first end connected to the housing and the second end forming a nose;
   a saw chain disposed on the guide bar and comprising at least one cutting tooth, wherein the at least one cutting tooth forms a head area of the saw chain, wherein the at least one cutting tooth comprises a top side located at the head area, and wherein the top side forms a roof of the saw chain;
   a sprocket disposed in the sprocket compartment;
   a drive motor driving the sprocket that is acting on the saw chain so as to circulate the saw chain about the guide bar in a running direction;
   wherein the boundary walls of the sprocket compartment having include a peripheral wall disposed adjacent to the roof of the saw chain and forming a boundary of the sprocket compartment;
   the sprocket compartment comprising an ejection opening for cut material, wherein the ejection opening is formed in the peripheral wall;
   the guide bar having a longitudinal center axis that intersects the saw chain in a first deflection area of the saw chain next to the sprocket and in a second deflection area of the saw chain next the nose of the guide bar;
   wherein one of the boundary walls of the sprocket compartment comprises an exit opening through which the saw chain is guided;
   wherein between the peripheral wall of the sprocket compartment and the roof of the saw chain, when the saw chain is standing still, a channel is formed;
   wherein the channel extends at the roof of the saw chain at least across a stretch of the saw chain, said stretch extending from the first deflection area to the location where the saw chain is guided through the exit opening;
   wherein, when the saw chain is standing still, the peripheral wall and the roof of the saw chain within the channel are positioned at a first spacing (b, c, d, e) of less than approximately 18 mm relative to each other across at least 50% of a length of said stretch of the saw chain across an entire width of the saw chain.

2. The power tool according to claim 1, wherein the first spacing (b c, d, e) is less than approximately 18 mm across at least 75% of the length of said stretch of the saw chain that extends from the first deflection area to the location where the saw chain is guided through the exit opening.

3. The power tool according to claim 1, wherein the first spacing (b c, d, e) is less than approximately 15 mm across more than 50% of the stretch of the saw chain that extends from the first deflection area to the location where the saw chain is guided through the exit opening.

4. The power tool according to claim 1, wherein the ejection opening is positioned, viewed in the running direction, upstream of the first deflection area.

5. The power tool according to claim 1, wherein the roof of the saw chain and the peripheral wall are positioned at the first deflection area at a second spacing (a) relative to each other and the second spacing, when the saw chain is standing still, is less than approximately 10 mm.

6. The power tool according to claim 1, wherein the roof of the saw chain and the peripheral wall are positioned at the first deflection area at a second spacing (a) relative to each other and the second spacing, when the saw chain is standing still, is less than approximately 5 mm.

7. The power tool according to claim 1, wherein the boundary walls of the sprocket compartment include a sidewall arranged on a side that is facing away from the housing.

8. The power tool according to claim 7, wherein, when the saw chain is standing still, the saw chain is spaced relative to the sidewall by a distance of less than approximately 5 mm across at least 50% of the stretch extending from the first deflection area to the exit opening and across an entire height of the saw chain.

9. The power tool according to claim 7, wherein the head area of the saw chain and the sidewall are spaced at a fourth spacing (f) relative to each other across a stretch of the saw chain extending from the first deflection area to an inlet into the guide bar and the fourth spacing (f) is less than approximately 5 mm.

10. The power tool according to claim 7, wherein the saw chain comprises connecting members and drive members, wherein the connecting members include the at least one cutting tooth, and wherein the connecting members are connected to the drive members in a connecting area in an articulate fashion, wherein the connecting area and the sidewall are positioned at a fifth spacing (g) relative to each other and the fifth spacing (g) is less than approximately 6 mm across a stretch extending from the first deflection area to an inlet into the guide bar.

11. The power tool according to claim 7, wherein the drive motor has a drive shaft with an end face and the end face of the drive shaft is positioned at a sixth spacing (i) relative to the sidewall, wherein the sixth spacing (i) is less than approximately 5 mm.

12. The power tool according to claim 1, wherein the boundary walls include a fill member disposed on the sprocket cover, wherein the fill member at least partially bounds the sprocket compartment.

13. The power tool according to claim 1, wherein the boundary walls include a glide bar arranged on the sprocket cover near the exit opening, wherein the glide bar laterally guides the saw chain, wherein the sprocket compartment at least partially is bounded by the glide bar.

14. A power tool comprising:
a housing;
a sprocket cover connected to the housing, wherein a sprocket compartment is disposed between the sprocket cover and the housing and wherein the sprocket compartment is delimited by boundary walls;
a guide bar having a first end and a second end, the first end connected to the housing and the second end forming a nose;
a saw chain disposed on the guide bar and comprising at least one cutting tooth, wherein the at least one cutting tooth forms a head area of the saw chain, wherein the at least one cutting tooth comprises a top side located at the head area, and wherein the top side forms a roof of the saw chain;
a sprocket disposed in the sprocket compartment;
a drive motor driving the sprocket that is acting on the saw chain so as to circulate the saw chain about the guide bar in a running direction;
the guide bar having a longitudinal center axis that intersects the saw chain in a first deflection area of the saw chain next to the sprocket and in a second deflection area of the saw chain next the nose of the guide bar;
wherein the boundary walls of the sprocket compartment include a peripheral wall disposed adjacent to the roof of the saw chain and forming a boundary of the sprocket compartment;
the sprocket compartment comprising an ejection opening for cut material, wherein the ejection opening is formed in the peripheral wall and is arranged in the running direction of the saw chain upstream of the first deflection area of the saw chain;
wherein one of the boundary walls of the sprocket compartment comprises an exit opening through which the saw chain is guided;
wherein a channel is formed between the roof of the saw chain and the peripheral wall of the sprocket compartment, wherein the channel has an inlet opening through which the saw chain is guided, wherein the channel extends across a stretch of the saw chain, said stretch extending from the inlet opening to the location wherein the saw chain is guided through the exit opening;
wherein the inlet opening is arranged in the running direction of the saw chain upstream of the first deflection area;
wherein, when the saw chain is standing still, the peripheral wall of the sprocket compartment and the roof of the saw chain are positioned at a first spacing of less than approximately 18 mm relative to each other across at least 50% of a length of said stretch of the saw chain across an entire width of the saw chain; and
wherein a guide part is arranged at the inlet opening and guides cut material to the ejection opening, wherein the guide part comprises a guide surface that delimits the ejection opening, wherein the guide surface, relative to a rest position of the power tool, is oriented to the rear of the power tool and downward so as to deflect cuttings in a direction to the ground.

15. The power tool according to claim 14, wherein the guide surface is positioned at an angle of more than 90 degrees relative to a tangential of the roof of the saw chain at the inlet opening.

16. The power tool according to claim 14, wherein, at the inlet opening, the roof of the saw chain is positioned relative to the peripheral wall at a third spacing (m) and the third spacing (m) is less than approximately 20 mm, when the saw chain is standing still.

* * * * *